:::

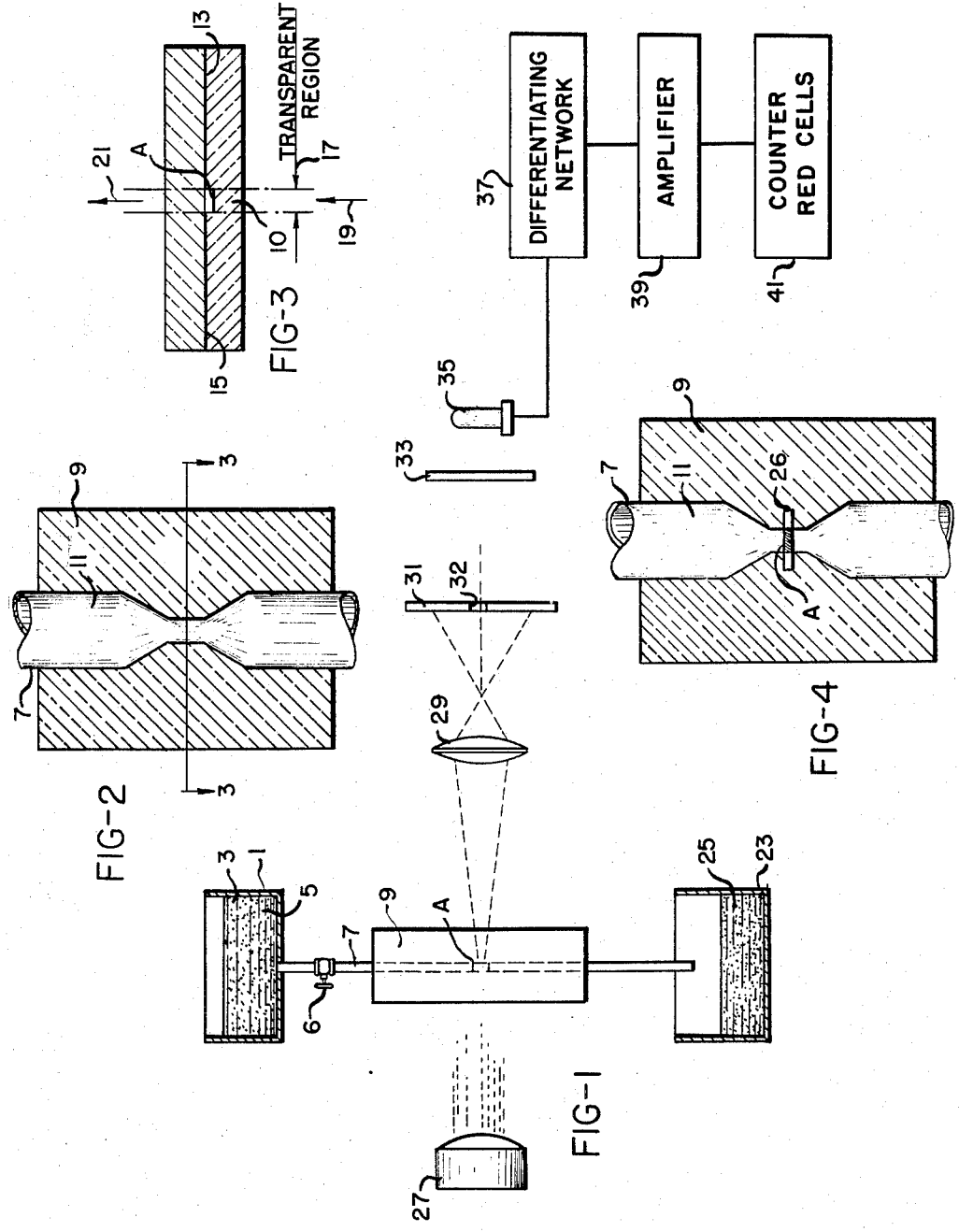

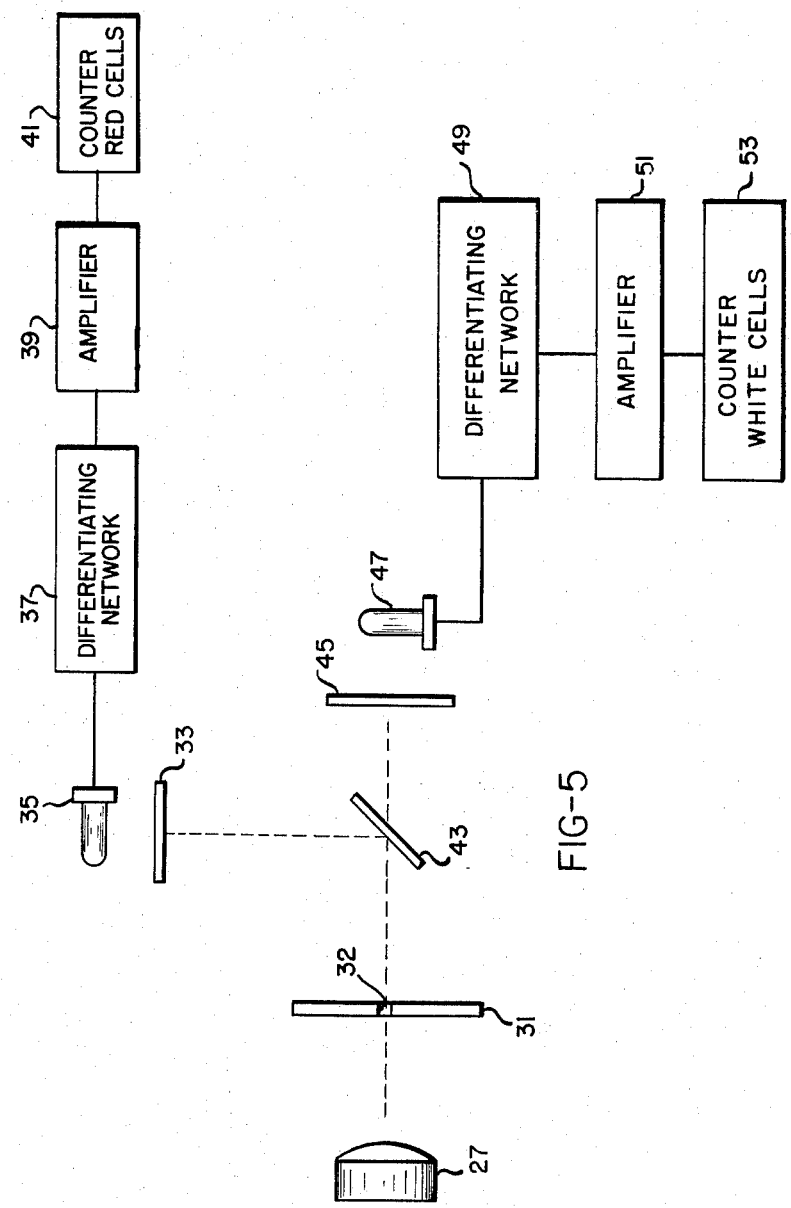

United States Patent Office 2,875,666
Patented Mar. 3, 1959

2,875,666

METHOD OF SIMULTANEOUSLY COUNTING RED AND WHITE BLOOD CELLS

James C. Parker and William R. Horst, Dayton, Ohio, assignors to The Commonwealth Engineering Company of Ohio, Dayton, Ohio, a corporation of Ohio Application July 13, 1953, Serial No. 367,708

2 Claims. (Cl. 88—14)

This invention relates to the counting of particles in physiological fluids and is particularly concerned with the counting of blood cells.

Blood cell counts and knowledge of the numbers of the distinguishable types of blood cells are of value in the diagnosis of diseases for example.

Counting methods currently in use involve in the determination, for example, of the number of red and white blood cells in a given sample, the making up of two volumes; in one volume the red cells are counted and in the second the white cells are counted. To effect the counting each sample is diluted, appropriately stained and placed in a counting chamber termed a hemocytometer and the number of cells in a small field are counted under a microscope by a skilled technician.

It is difficult with such a method to determine the exact theoretical volumes, the exact geometry of the counting chamber, and it is further substantially impossible to secure an exactly representative distribution of cells in the portion of the field under the microscope.

The errors are great particularly due to the fact that only a very small portion of the total number of cells in an original sample volume are actually counted, for example, 500 in the case of a normal density of 5,000,000 red cells per cubic millimeter. Surveys indicate that the error probably is about ±16 percent for a sample with 5,000,000 red cells per cubic millimeter and ±22 percent for a sample of 7,000 white cells per cubic millimeter. In many instances personal errors of the technician contribute to further deviation.

It is a primary object of this invention to describe a new method for obtaining cell counts, which method eliminates errors due to imperfect dilution, counting chamber geometry, and non-representative viewing fields.

It is a further object of this invention to describe a novel method for cell counts which enables substantially all of the cells of the sample to be counted.

It is an important object of this invention to describe a process which permits the simultaneous counting of blood cells of different types.

It is also an object of this invention to describe an apparatus arrangement which permits of quick accurate determination of the cell counts.

The invention contemplates that the cells to be counted will be capable of absorbing light of one color while transmitting that of another color. The cells are presented successively to a light which comprises both the color to be absorbed and the color to be transmitted. Absorption of the one color causes a decrease in intensity of that color as well as of the total light, and this drop in intensity of the color is used to actuate an electronic circuit arrangement including a counting unit. Such electronic circuit arrangements are in themselves well known to the art and form no part of the present invention and accordingly will be discussed hereinafter only in sufficient detail to illustrate the invention.

In practice samples of blood, the red and white cells of which are to be counted, are first suspended in an appropriate solution such as an isotonic solution, in order to form a dilute suspension of the cells; the term dilute as used herein is intended to convey the meaning that the concentration of the cells in the medium is considerably less than that occurring normally in the blood itself.

The cells are preferably stained in order to emphasize their color absorption properties; the staining of the cells under consideration is a well known art and thus two types of cells in a suspension, as for example the usual red and white cells, may be selectively stained in the presence of each other. The stain may be formulated to enhance the normal red coloration of the red cells and to simultaneously stain the white cells to a violet, indigo or blue. The particular stain formulation employed for a given operation may be readily selected and the formulations in themselves form no part of this invention.

In the method of invention then as practiced a dilute suspension of stained red and white cells may be caused to fall by gravity in a narrow conduit which is itself provided with a constriction; this conduit and constriction and the dilution of the suspension permit the cells to pass in substantially successive or sequential fashion through the constriction and as they do so they are subjected to the light source referred to hereinbefore.

The transmitted light decreased in intensity by the color absorption by the cells is then directed through a filter onto a photocell which is responsive to the decrease in the light intensity; the filter through which this light passes in the counting of red blood cells for example, is a filter which normally would pass light of the color which is absorbed by the red cells to be counted. Red cells, for example, absorb blue light and accordingly there will be a decrease in intensity of blue light transmitted and a blue pass filter which prevents the passage of colors other than blue, if placed before the photocell, will permit the impression thereon of blue light of varying intensity as the cells pass. A suitable electrical circuit actuated by the photocell notes these changes in intensity which each correspond to a cell passage and reflects the number of changes, that is the number of cells passing, on a counter.

The apparatus may be arranged to count the white cells at the same time that the red cells are counted and all that is required for this purpose is that a filter also be provided which permits the passage of, for example, red light if the white cells are stained violet. The photocell responsive to the red light then actuates the counter in the manner referred to hereinbefore. It is thus seen that it is only necessary to stain the cell distinctly and to pass a portion of the light through the cells through various filters having the capacity for passing different light colors.

The invention will be more fully understood by reference to the following detailed description and accompanying drawings wherein:

Figure 1 is a schematic view illustrating apparatus usable in the practice of the method of invention;

Figure 2 is a view partially in section of the conduit and constriction through which the particles pass to be counted;

Figure 3 shows a view on line 3—3 of Figure 2;

Figure 4 is a view partially in section illustrating slit means useful in the practice of the invention in connection with the constriction; and Figure 5 is a view illustrating another embodiment of the invention.

Referring to the drawings there is shown at 1 a vessel having a suspension medium 3 containing particles of red blood cells 5 to be counted. Conduit 7 which is preferably only slightly larger than a capillary is connected to the support 9 for the orifice conduit 11, which conduit 11 as indicated at A is provided with a constriction.

As indicated in Figure 1 the suspension 3 and particles 5 when valve 6 is open may flow under the influence of gravity through the conduits 7, 11 and the constriction A to a receiver 23 wherein the particles are collected as at 25. As noted hereinbefore the suspended medium is preferably an isotonic solution such as 0.9 percent NaCl in distilled water.

The constriction A as shown more clearly in Figures 2 and 3 as well as the conduit 11 is provided with the transparent support member 9 and a channel 10 exists for the passage of light through the member. Numerals 13 and 15 indicate black masks which bound the light channel 10 and prevent the passage of light other than through the channel. Thus, as indicated at 17, the transparent region permits light to pass transversely as indicated by the arrows 19 and 21 through the member 9 only at the area of the constriction A.

The thickness or depth of the constriction A, that is the dimension taken parallel to the light beam (Figure 3) should be sufficiently small to minimize the probability of simultaneous passage of a number of cells in that dimension. The width of the constriction may be as large as is consistent with the generation of a detectable change in the total light flux due to the passage of a single cell across a narrow slit (Figure 4) oriented in a plane perpendicular to the direction of flow of the cells.

It is to be particularly noted then that the system is opaque except for that area where the scanning slit 26 (Figure 4) and the transparent constriction coincide which is indicated by the shaded area in Figure 4.

For adequate resolution of the cells that may pass the slit almost simultaneously in a horizontal line the slit 26 should have a dimension considerably less than the diameter of a single cell. Since the production of an actual slit of such width is difficult it is preferable to form an equivalent slit by optically magnifying the constriction or counting orifice itself, which is effectively done by inserting a mask 31 in the magnified real image of the constriction. This image is then provided with a slit which may of course be considerably less than the slit at the constriction itself. A lens 29 inserted between the mask 31 and the constriction facilitates the concentration of the light flux passing through the constriction.

It is to be noted that with the above arrangement the actual slit 32 of the mask 31 is considerably larger than the slit adjacent the constriction. The omission of the slit from the counting orifice or constriction also removes the mask from destructive action of cleaning agents and permits manufacture on an economical basis.

As shown in Figure 1 for the counting of red blood cells a blue-pass filter 33 is placed between the mask 31 and photocell 35 which latter is connected to a differential network 37 and amplifier 39 and counter 41. The elements 37, 39 and 41 are standard equipment and accordingly are not described in detail.

In the operation of the device of Figure 1 the suspension together with the small red blood cell particles moving through the constriction A are stained to absorb blue light emitted from the light source 27 and to the receiver 23. The light transmitted through the support 9 at the constriction A passes through the lens 29 to aperture 32 in the mask 31 and then through the blue-pass filter 33.

Photocell 35 is normally in a conductive state under the influence of white light passing thereto from the source 27 and since only blue light will pass through the filter 33 it is blue light which occasions the normal functioning of photocell 35. As the cells pass through the constriction the intensity of blue light passing to the filter 33 is decreased and this change of energy passed to the photocell 35 produces a momentary change in the electrical output of the cell 35, causing a similar change in the differentiating network 37, amplifier 39 and occasioning counting by the counter 41. Thus as the cells pass downwardly from the vessel 1 to the receiver 23 they are counted very rapidly.

In practice only a small volume of suspension, for example a tenth of a cubic millimeter, is required in vessel 1 in order to attain an accurate counting of the cells. It is apparent however that a large volume of suspension and a correspondingly large number of cells may be passed through the apparatus in a short time and that the counting arrangement is very rapid.

Figure 5 illustrates a further embodiment and the figure has identical numerals for the corresponding parts shown in Figure 1. In addition, in the arrangement of Figure 5 there is shown at 43 a half-silvered mirror which divides the light passing through the slit 32 of the mask 31 into two portions so that some of it strikes the blue-pass filter 33 while the remainder is transmitted to the red-pass filter 45.

The elements 33, 35, 37, 39, 41 in this embodiment function precisely as they do in connection with the description of Figure 1. However, in the present instance the suspension which is passed through the constriction contains both red and white cells, the red cells being as described hereinbefore and the white cells being stained to permit the absorption of red light thereby.

Thus as the white cells pass through the white light source or the polychromatic light source they absorb red light and the portion of the light transmitted to the filter 45 will be deficient in red light and the quantity of red light transmitted onto the photocell 47 will be reduced in intensity over that normally supplied to the photocell 47 by the white light. Accordingly a change occurs in the output of the photocell 47 which is differentiated, amplified and counted just as described in connection with Figure 1. Accordingly means has been provided for the counting of red and white cells at one time. Other similar cells could of course be counted in the same manner by simply increasing the number of filters and dispersing the light transmitted through the cells.

It is to be noted in connection with the foregoing that the electrical signals are so differentiated by the networks 37 and 39 that a signal is transmitted to the amplifier only when there is a change in photocell illumination. A steady electrical circuit produced by quiescent illumination of the photocell or slow drifts in illumination are not transmitted to the amplifier. The amplifier is required to deliver a signal to operate the counter as at 41 or 53.

With regard to the accuracy of the arrangement it is to be noted that to insure of precision counting it is well to dilute the cells rather highly and by chemical treatment of the suspension to avoid the formation of rouleaux or clusters of cells. The dilution of course tends to avoid the presentation of more than one cell at a time to the scanning slit and constriction, whereby they might be counted as one cell which of course would tend to produce a low count. The clusters of cells would have the same effect and should be avoided.

The dyes for the staining of the solutions are conventional as noted hereinbefore. It is not essential that the red cells be stained; but Wright's solution may be employed for selective staining of the red and white cells for the accomplishment of the process of invention. Generally eosin in combination with methylene blue and other organic dyes is employed also for staining the cells.

It will be understood that this invention is susceptible to modification in order to adapt it to different usages and conditions and accordingly, it is desired to comprehend such modifications within this invention as may fall within the scope of the appended claims.

We claim:

1. In a method of simultaneously counting red and white blood cells, the steps of staining the red and white cells two different colors, one for the red and another for the whitecells; forming a suspension of the stained cells having the different colors; passing the suspension slowly through a light source which emits light of the same colors as those of the stained cells to expose the individual cells to the light and whereby the light transmitted is reduced in intensity as to each color by cells of the other color; and recording a separate electrical response to the decreases in intensity occasioned by the passage of the individual cells.

2. In a method of simultaneously counting red and white blood cells the steps of staining the red cells red and the white cells blue, forming a suspension of the blue- and red-stained cells, passing the suspension slowly through a light source which emits both red and blue light to expose the individual cells to the light and whereby the light transmitted is reduced in intensity as to the red by the blue-stained cells and as to the blue by the red-stained cells, and recording a separate electrical response to the decreases in intensity occasioned by the passage of the individual cells.

References Cited in the file of this patent

UNITED STATES PATENTS

| | | |
|---|---|---|
| 1,971,443 | Exton | Aug. 28, 1934 |
| 1,974,522 | Twyman et al. | Sept. 25, 1934 |
| 2,369,577 | Kielland | Feb. 13, 1945 |
| 2,519,997 | Brown | Aug. 22, 1950 |
| 2,584,052 | Sandorff et al. | Jan. 29, 1952 |
| 2,661,902 | Wolff et al. | Dec. 8, 1953 |
| 2,791,150 | Stevens | May 7, 1957 |

OTHER REFERENCES

"The Microscope," 1911, Hogg, pgs. 292, 295, published by George Rutledge & Sons Ltd., London.